(12) United States Patent
Nakamura et al.

(10) Patent No.: US 8,681,393 B2
(45) Date of Patent: Mar. 25, 2014

(54) IMAGE READER CAPABLE OF DETECTING BLANK DOCUMENT SHEET

(75) Inventors: Naoyuki Nakamura, Toyoake (JP); Takashi Maeda, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 174 days.

(21) Appl. No.: 13/073,787

(22) Filed: Mar. 28, 2011

(65) Prior Publication Data

US 2012/0081761 A1 Apr. 5, 2012

(30) Foreign Application Priority Data

Sep. 30, 2010 (JP) ................................ 2010-221928

(51) Int. Cl.
*H04N 1/04* (2006.01)
*H04N 1/60* (2006.01)
*G06F 3/12* (2006.01)
*H04N 1/40* (2006.01)
*G06K 15/00* (2006.01)
*G06K 9/00* (2006.01)

(52) U.S. Cl.
USPC ........... 358/474; 358/1.9; 358/1.15; 358/462; 358/1.14; 382/165

(58) Field of Classification Search
USPC .......... 358/474, 1.9, 1.15, 462, 1.14; 382/165
See application file for complete search history.

(56) References Cited

U.S. PATENT DOCUMENTS

2009/0080033 A1* 3/2009 Arai .............................. 358/462
2010/0002259 A1* 1/2010 Maruyama et al. .......... 358/1.15

FOREIGN PATENT DOCUMENTS

| JP | 2001-143050 A | 5/2001 |
| JP | 2008-022276 A | 1/2008 |
| JP | 2010-016770 A | 1/2010 |

OTHER PUBLICATIONS

Japanese Office Action dated Jan. 8, 2013 received from related Japanese Application No. 2010-221928 together with an English language translation.

* cited by examiner

*Primary Examiner* — Charlotte M Baker
*Assistant Examiner* — Rury Grisham
(74) *Attorney, Agent, or Firm* — Scully, Scott, Murphy & Presser, P.C.

(57) ABSTRACT

An image reader includes a reading unit that is configured to read an image on a document sheet to generate read data, a counting unit that is configured to count a number of pixels of the read data having more than a predetermined gray level, a determining unit that determines that the document sheet is blank when the number of pixels counted by the counting unit is not exceeding a threshold value, a display unit that is configured to display the number of pixels counted by the counting unit and the threshold value when the document sheet has been determined to be blank, in a manner that the number of pixels can be compared with the threshold value, and a changing unit that changes the threshold value.

6 Claims, 8 Drawing Sheets

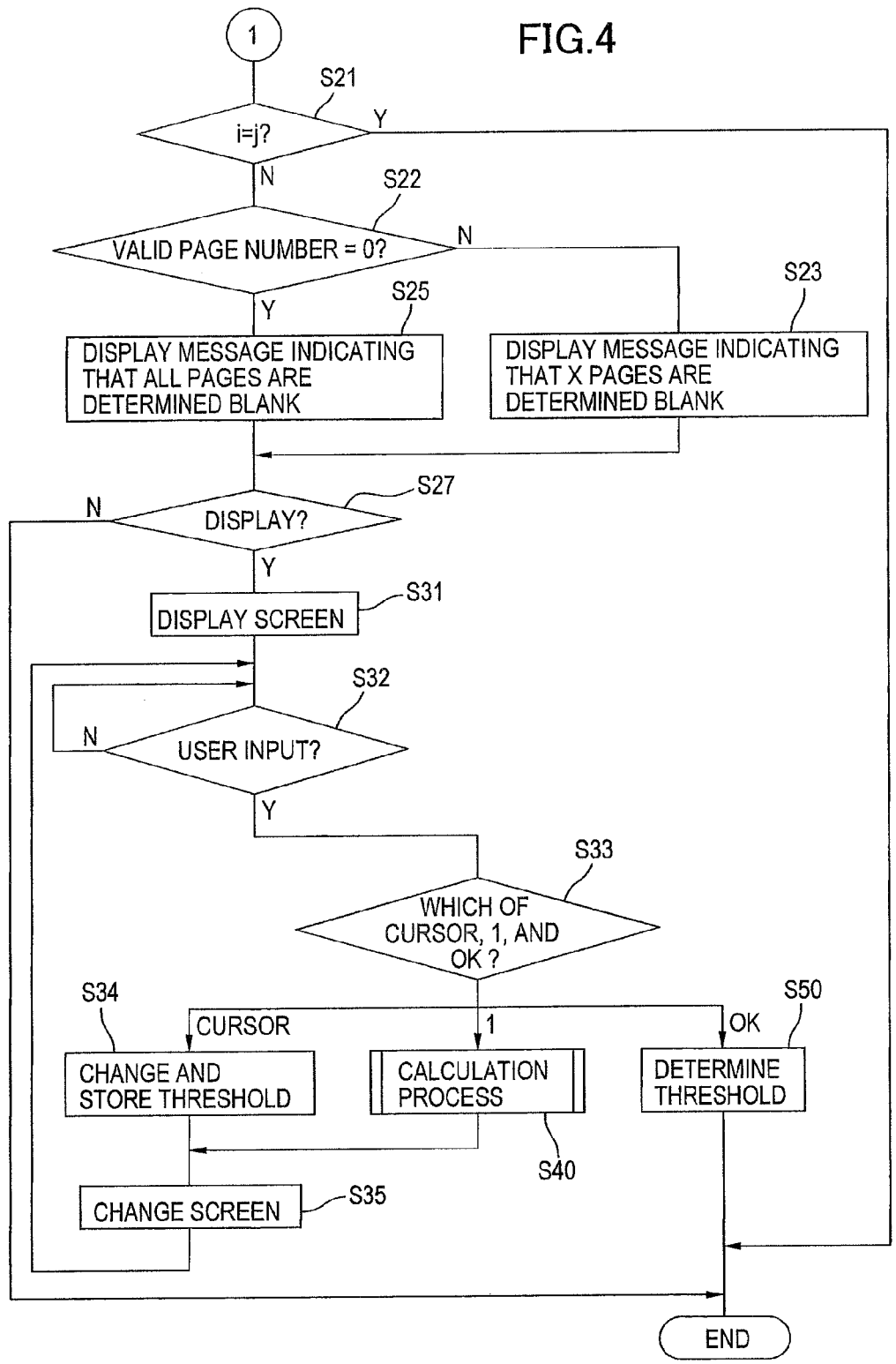

IMAGE READER CAPABLE OF DETECTING BLANK DOCUMENT SHEET

CROSS REFERENCE TO RELATED APPLICATION

This application claims priority from Japanese Patent Application No. 2010-221928 filed Sep. 30, 2010. The entire content of this priority application is incorporated herein by reference.

TECHNICAL FIELD

The present invention relates to an image reader for reading an image on a document sheet and, more particularly, to an image reader capable of detecting a blank document sheet.

BACKGROUND

There has been proposed an image reader capable of detecting a blank document sheet when reading images on document sheets. When a blank document sheet is detected, preview images for document sheets other than the one found to be blank are generated and displayed, allowing a user to confirm.

SUMMARY

When the preview images are displayed in this manner, the user can quickly notice the existence of a blank document sheet or find out that the document sheet has erroneously been placed upside down. However, a document sheet may be erroneously determined to be blank based on inappropriately set threshold. In this case, however, the user cannot determine whether or not the threshold is appropriately set, and the user cannot determine how the threshold should be modified.

In view of the foregoing, it is an object of the invention to provide an image reader that displays, when a blank document sheet is detected, the number of pixels having a predetermined or more gray level and the threshold for blank sheet detection in a comparable manner so as to allow a user to modify the threshold for blank sheet detection to an appropriate value with reference to the display.

In order to attain the above and other objects, the invention provides an image reader including a reading unit, a counting unit, a determining unit, a display unit, and a changing unit. The reading unit is configured to read an image on a document sheet to generate read data. The counting unit is configured to count a number of pixels of the read data having more than a predetermined gray level. The determining unit determines that the document sheet is blank when the number of pixels counted by the counting unit is not exceeding a threshold value. The display unit is configured to display the number of pixels counted by the counting unit and the threshold value when the document sheet has been determined to be blank, in a manner that the number of pixels can be compared with the threshold value. The changing unit changes the threshold value.

BRIEF DESCRIPTION OF THE DRAWINGS

The particular features and advantages of the invention as well as other objects will become apparent from the following description taken in connection with the accompanying drawings, in which:

FIG. 4 is a second half of the flowchart representing the image reading process;

DETAILED DESCRIPTION

Figure 1:
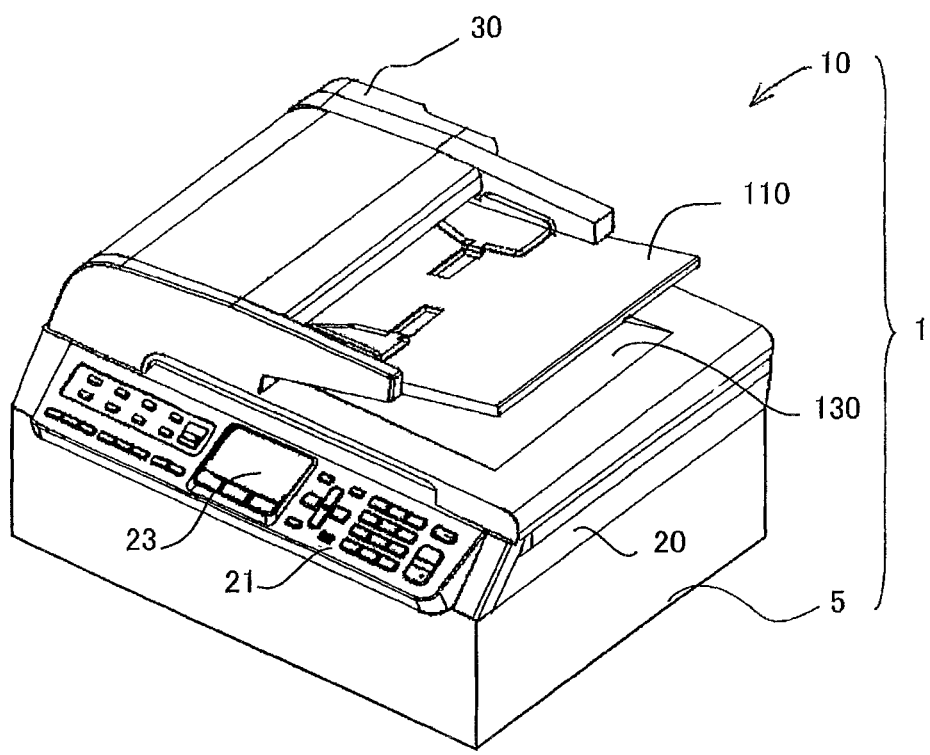
FIG. 1 is a perspective view of a multifunction device according to an embodiment of the invention.

An embodiment of the invention will be described while referring to the accompanying drawings wherein like parts and components are designated by the same reference numerals to avoid duplicating description.

As shown in FIG. 1, a multifunction device 1 according to the embodiment includes a printer unit 5 and a scanner unit 10 disposed on top of the printer unit 5. The printer unit 5 incorporates a recording unit 51, a FAX unit 53, and a USB interface 57 shown FIG. 2.

The scanner unit 10 is an example of an image reader of the present invention, and includes a flatbed portion 20 on which a thick document, such as a book, is placed and a document sheet cover 30 disposed on the flatbed portion 20 so as to be selectively opened and closed. The document sheet cover 30 incorporates an automatic document feeder (ADF). The flatbed portion 20 is provided at the front end thereof with an operation unit 21 having various buttons, and a display unit 23 constituted by a liquid crystal display.

The ADF of the document sheet cover 30 is a well-known one that conveys document sheets from a sheet feed tray 110 of the document sheet cover 30 one by one and discharges the document sheets to a sheet discharge tray 130. The document sheet cover 30 is configured such that a reading device 140 (FIG. 2) can be disposed on a document sheet feeding path defined inside the document sheet cover 30. The reading device 140 is a well-known reading device configured of a CIS or a CCD. In this embodiment, the reading device 140 is disposed inside the flatbed portion 20. The reading device 140 can read images on the document sheets conveyed by the ADF as mentioned above, and also can read images on the document sheets placed on the flatbed portion 20 while moving along the surface of the flatbed portion 20 (refer to Japanese Patent Application Publication No. 2008-124997, for example).

Figure 2:
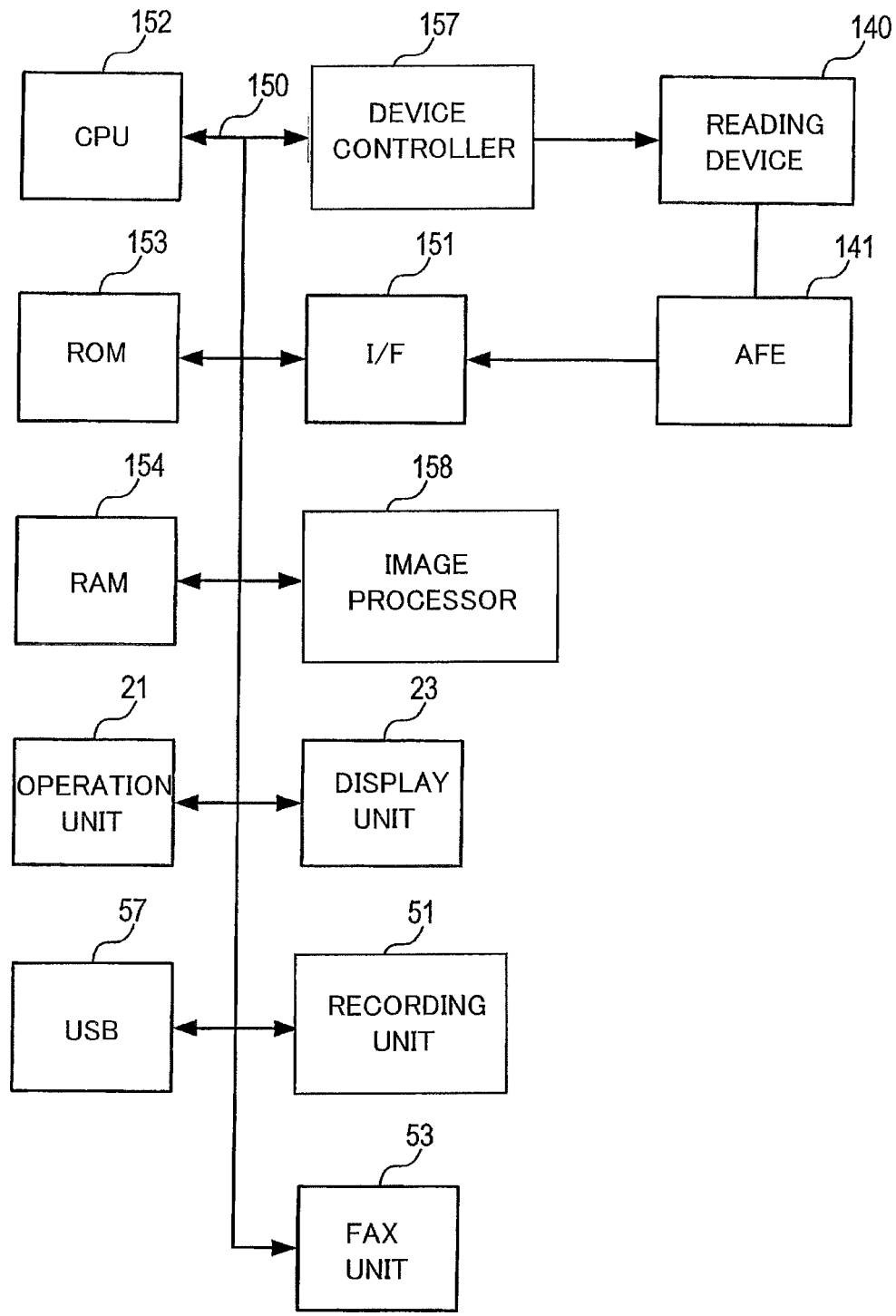
FIG. 2 is a block diagram showing the configuration of an operation system of the multifunction device according to the embodiment of the invention.

As shown in FIG. 2, the reading device 140 (example of a reading unit) is connected to an interface (I/F) 151 via an Analog Front End (AFE) 141. The AFE 14 generates read data by converting an analog signal output from the reading device 140 to digital data. The interface 151 is connected to a bus 150, which is also connected to a CPU 152 (a counting unit, a determining unit, a changing unit), a ROM 153, and a RAM 154 so as to enable execution of various processing. The bas 150 is also connected to the recording unit 51, the FAX unit 53, the USB interface (USB) 57, a device controller 157 for controlling the reading device 140, and an image processor 158 for executing various image processing on read data. (The recording unit 51, the FAX unit 53, and the USB interface 57 function as an output unit.)

The recording unit 51 is configured to form an image on a sheet as a recording medium in an electrophotographic method. In a copy mode, for example, the recording unit 51 forms an image read from a document sheet by the reading device 140 on a sheet. The FAX unit 53 is configured to transmit and receive facsimile data through a telephone line. In a FAX transmission mode, for example, the FAX unit 53 transmits facsimile data corresponding to an image on a document sheet read by the reading device 140. The USB interface 57 is capable of being attached with a USB cable or a USB memory (not shown). In a PC scan mode, for example, the USB interface 57 transmits data corresponding to an image on a document sheet read by the reading device 140 to a personal computer or the like through the USB cable. The device controller 157 is configured to transmit well-known signals to the reading device 140, instructing the reading device 140 to turn ON/OFF a light source or to output read data (analog data).

Next, an image reading process according to the embodiment will be described with reference to FIGS. 3 and 4. The image reading process is executed by the CPU 152 based on programs stored in the ROM 153 with the ADF incorporated in the document sheet cover 30. In this process, a document may include one or more number of pages (document sheets).

Figure 3:
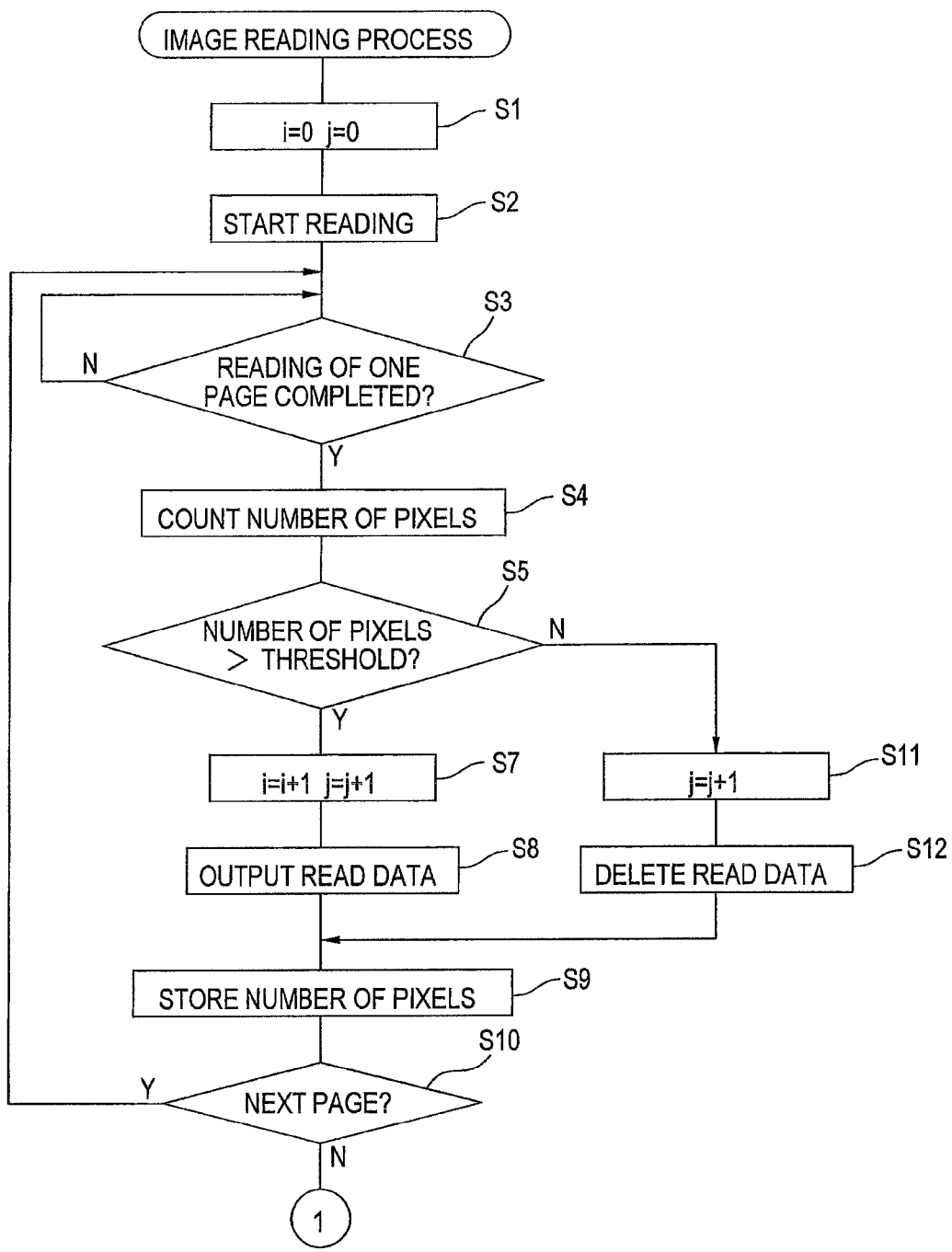
FIG. 3 is a first half of a flowchart representing an image reading process executed on the multifunction device according to the embodiment of the invention.

As shown in FIG. 3, first, in S1, the CPU 152 resets both a valid page number counter value i and a read page number counter value j set in the RAM 154 to 0. Next, in S2, the CPU 152 instructs the reading device 140 to start well-known reading operation (controlled by another routine) to generate read data corresponding to images on the document sheet(s) and stores the read data in the RAM 154. In S3, the CPU 152 determines whether or not a single sheet (page) of the document has been read to generate one-page-worth of read data. If not (S3:N), then the CPU 152 repeats the process of S3. On the other hand, if so (S3:Y), then the CPU 152 proceeds to S4.

In S4, the CPU 152 (serving as the counting unit) counts the number of pixels whose gray level is within a predetermined range among all pixels of the one-page-worth of read data. It should be noted that in this embodiment no upper limit is set for the range, so the CPU 152 virtually counts in S4 the number of pixels having gray level that is greater than a predetermined gray level.

Next in S5, the CPU 152 (serving as the determining unit) determines whether the number of pixels counted in S4 is larger than a prescribed blank sheet determination threshold value. If so (S5:Y), it can be assumed that the current page of the document is not blank. Thus, the current page is determined to be valid, and the CPU 152 proceeds to S7. In S7, the CPU 152 increments both of the valid page number counter value i and the read page number counter value j by 1, and then proceeds to S8.

In S8, the CPU 152 outputs the read data as normal data. For example, the read data is transmitted to the recording unit 51 if the multifunction device 1 is in the copy mode, transmitted to the FAX unit 53 if the multifunction device 1 is in the FAX transmission mode, and transmitted to the USB interface 57 if the multifunction device 1 is in the PC scan mode. Next in S9, the CPU 152 stores the number of pixels counted in S4 into the RAM 154. In S10, the CPU 152 determines whether a next page of the document exists. If so (S10:Y), then the CPU 152 returns to S3.

On the other hand, if a negative determination is made in S5 (S5:N), then it can be assumed that the current page of the document is blank. In this case, the CPU 152 proceeds to S11 to only increment the read page number counter value j by 1. Then, in S12, the CPU 152 deletes the read data from the RAM 154 without outputting the same, and proceeds to S9. Thus, unnecessary output can be avoided. After all pages of the document set on the sheet feed tray 110 have been read by repetitive execution of the processes from S3 to S12, a negative determination is made in S10 (S10:N), and the CPU 152 proceeds to S21 of FIG. 4.

In S21, the CPU 152 determines whether the valid page number counter value i is equal to the read page number counter value j. If so (S21:Y), this means that the document contains no page that is determined to be blank, and the CPU 152 ends the image reading process.

On the other hand, if not (S21:N), then the CPU 152 proceeds to S22 to determine whether or not the valid page number counter value i is 0. If not (S22:N), then the CPU 152 proceeds to S23.

In S23, the CPU 152 controls the display unit 23 to display a message indicating that X pages of the document have been determined to be blank. Note that the number "X" is obtained by subtracting the valid page number counter value i from the read page number counter value j. The message can be "X pages have been determined to be blank. If this determination is deemed incorrect, press OK button," for example, and enables a user to instruct modification of a criterion for the blank sheet determination (determination so to whether blank or valid). Similarly, when a positive determination is made in S22 (S22:Y), the CPU 152 controls in S25 the display unit 23 to display a message indicating that all the pages of the document have been determined to be blank. This message can be "All pages are determined to be blank. If this determination is deemed incorrect, press OK button," for example, and enables a user to instruct the modification of the criterion for the blank sheet determination.

When the user presses the OK button in response to the message displayed in S23 or S25, or when a predetermined time has elapsed after the message is displayed in S23 or S25 without the OK button being pressed, the CPU 152 proceeds to S27. In S27, the CPU 152 determines whether or not to display the blank sheet determination threshold value. In this embodiment, if the user has pressed the OK button in either S23 or S25, then the CPU 152 determines that there is a user input indicating that the blank sheet determination threshold value is inappropriate and needs to be modified, and the CPU 152 makes a positive determination in S27. If a negative determination is made in S27 (S27:N), then the CPU 152 ends the image reading process. On the other hand, if a positive determination is made in S27 (S27:Y), then in S31, the CPU 152 controls the display unit 23 to display a display screen, such as that shown in FIG. 5A, which shows the number of pixels counted in S4 for each page and the blank sheet determination threshold value, in a manner that these numbers of pixels can be compared with the blank sheet determination threshold value.

Figure 5A:
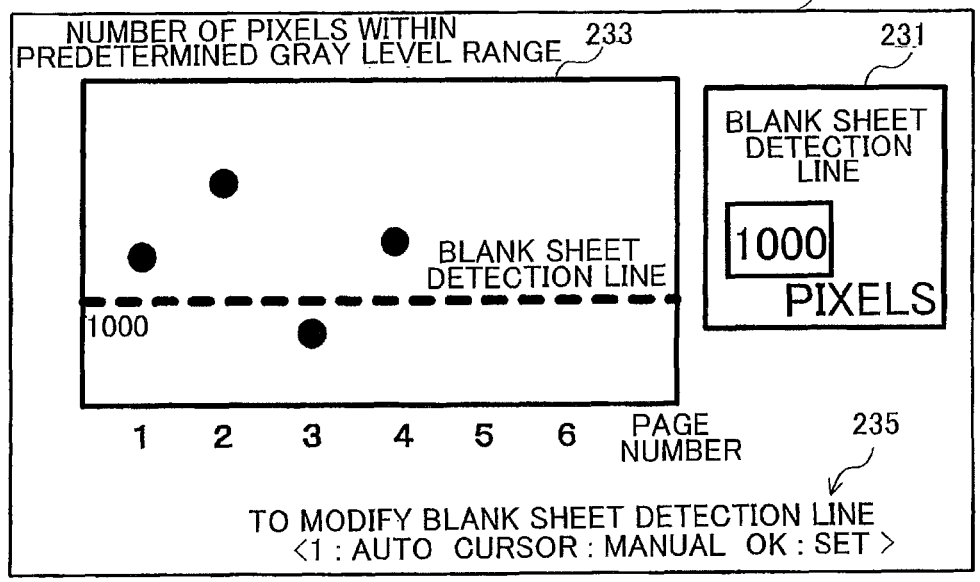
FIG. 5A is an explanatory diagram showing an example of display screen according to the embodiment of the invention.

More specifically, as shown in FIG. 5A, the display screen has a threshold display section 231, a pixel number display section 233, and a message display section 235. In the threshold display section 231, the blank sheet determination threshold value is displayed in a numerical value. In this embodiment, the "blank sheet determination threshold value" is expressed as "blank sheet detection line" on this display screen for user's easy understanding. In the pixel number display section 233, the number of pixels counted in S4 is displayed for each page. In this embodiment, the pixel number display section 233 is configured as a graph having the horizontal axis representing the page number and the vertical axis representing the number of pixels counted in S4. Each dot on this graph indicates the page number and the number of pixels counted in S4 for this page. A horizontal dotted line on the graph represents the blank sheet determination threshold value, indicating that a page having a dot located below the horizontal dotted line has been determined to be blank.

In the example shown in FIG. 5A, the number of pixels counted in S4 of the 3rd page among four pages of the document falls below the blank sheet determination threshold value (blank sheet detection line), and this third page has been determined to be blank.

The message display section 235 is for displaying a message. In this embodiment, the message display section 235 displays an instruction for a user to press a "1" button for automatically setting the blank sheet determination threshold value, to press a cursor button for manual setting, and to press the OK button for setting the blank sheet determination threshold value to a blank sheet determination threshold value being displayed.

Referring back to FIG. 4, in S32, the CPU 152 determines whether or not a user has pressed any of the cursor button, "1" button, and OK button. If not (S32:N), then the CPU 152 waits until the user presses a button. If the user has pressed a button (S32:Y), then the CPU 152 determines in S33 which one of the cursor button, the "1" button, and the OK button has been pressed by the user. When it is determined that the cursor button has been pressed (S33:cursor), then the CPU 152 proceeds to S34, in which the CPU 152 (serving as the changing unit) changes (increases or decreases) the blank sheet determination threshold value according to the user operation on the cursor button and stores the changed blank sheet determination threshold value in the RAM 154. Next in S35, the CPU 152 changes the display screen on the display unit 23 to reflect this change on the blank sheet determination threshold value. Then, the CPU 152 returns to S32.

Figure 5B:
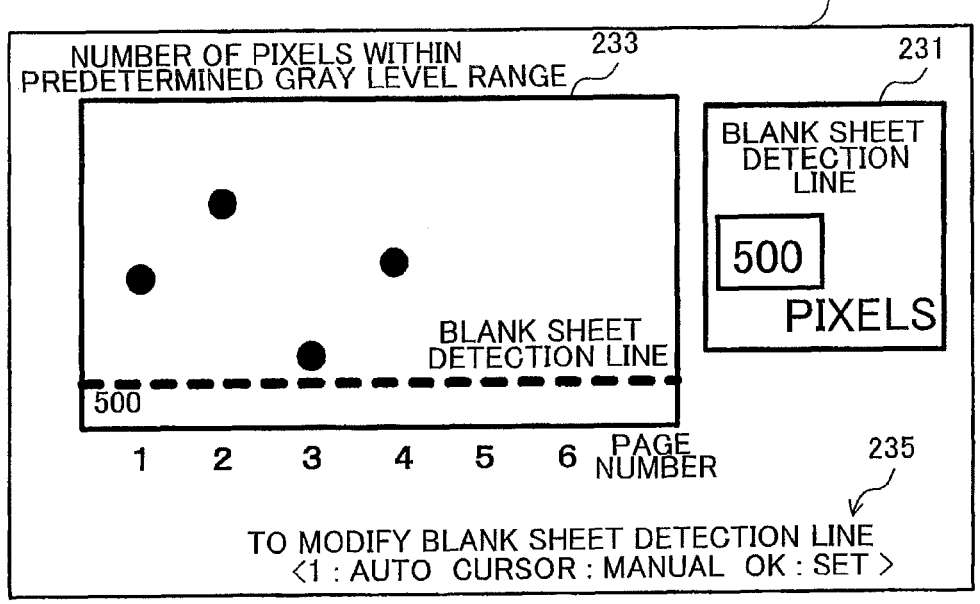
FIG. 5B is an explanatory diagram showing an example of display screen according to the embodiment of the invention.

For example, when the blank sheet determination threshold value (blank sheet detection line) is decreased from 1,000 pixels to 500 pixels, then the display screen on the display unit 23 is changed from one that is shown in FIG. 5A to one that is shown in FIG. 5B. In this example, by decreasing the blank sheet determination threshold value to 500 pixels, all the four pages of the document are determined not to be blank.

Referring back to FIG. 4, when it is determined in S33 that the "1" button has been pressed (S33:1), then the CPU 152 (serving as the changing unit) executes a calculation process for calculating the blank sheet determination threshold value in S40.

Figure 6:
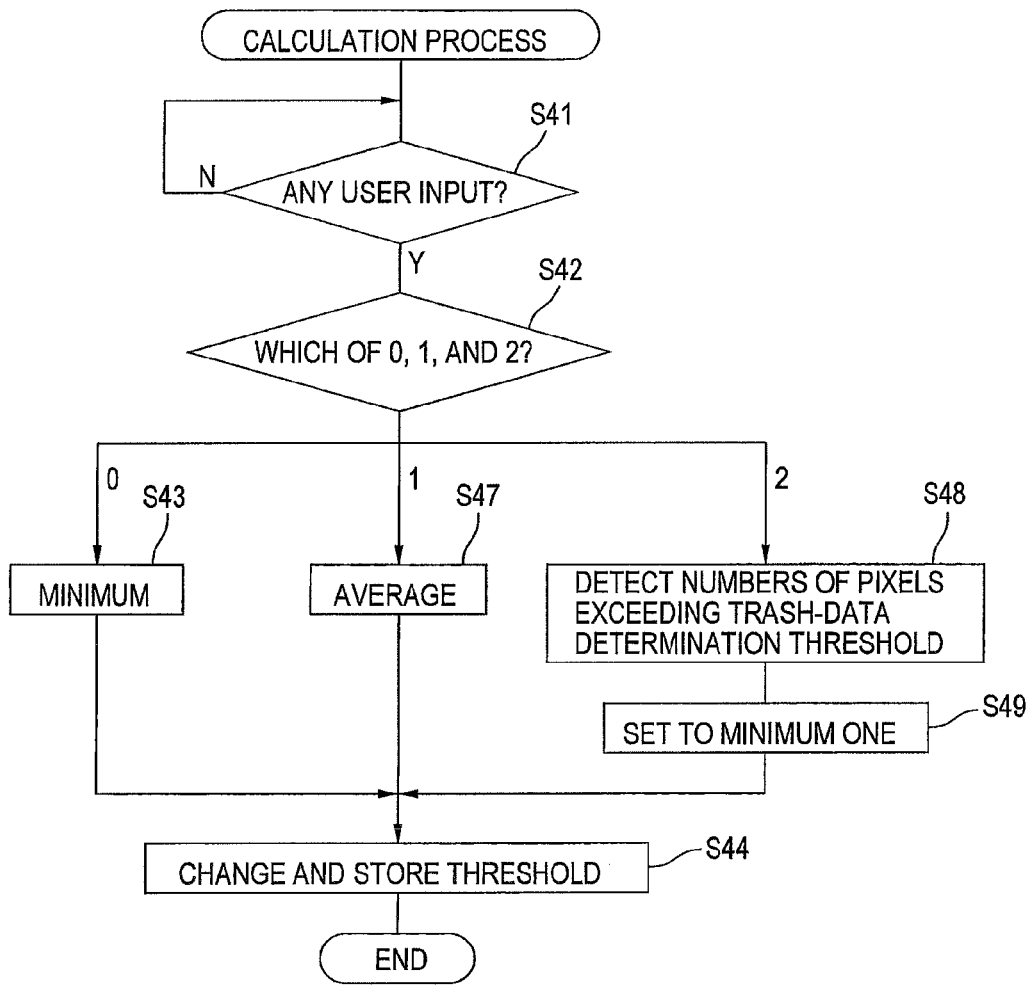
FIG. 6 is a flowchart representing calculation process according to the embodiment of the invention.

The calculation process executed in S40 will be described with reference to the flowchart of FIG. 6. First in S41, the CPU 152 determines whether or not any one of "0" button, "1" button, and "2" button has been pressed. If not (S41:N), then the CPU 152 waits until any of these buttons is pressed. Note that, while waiting in S41, the CPU 152 may control the display unit 23 to display a message "blank sheet detection line automatic calculation 0:minimum, 1:average, 2:trash."

When any one of the three buttons is pressed (S41:Y), then in S42 the CPU 152 determines which one of the buttons has been pressed. If it is determined that "0" button has been pressed (S42:0), then in S43 the CPU 152 selects a minimum one of the numbers of pixels stored for each page in the RAM 154 and sets the blank sheet determination threshold value to a value of the selected minimum number. Next, the CPU 152 stores the blank sheet determination threshold value in the RAM 154 in S44, and then ends calculation process.

If it is determined in S42 that "1" button has been pressed (S42:1), then in S47 the CPU 152 calculates an average value of the numbers of pixels stored in the RAM 154 and sets the blank sheet determination threshold value to this average value. Then, the CPU 152 proceeds to S44.

If it is determined in S42 that "2" button has been pressed (S42:2), then in S48 the CPU 152 detects one or more numbers of pixels that is exceeding a trash-data determination threshold value from among the numbers of pixels stored in the RAM 154. The dust-data determination threshold value has previously been set to a number of pixels within the predetermined gray level range that may be included in read data of blank document sheet due to stain or the like on the sheet, and stored in the ROM 153. Next in S49, the CPU 152 selects a minimum number from among the numbers detected in S48 and sets the blank sheet determination threshold value to the selected minimum number. Then the CPU 152 proceeds to S44.

Each time the processes from S32 to S40 of FIG. 4 are executed, the contents displayed in the threshold display section 231 and the pixel number display section 233 are changed (S35) in response to the user's input. If it is determined in S33 that the OK button has been pressed (S33:OK), then in S50, the CPU 152 determines the blank sheet determination threshold value set at that time point, stores the determined blank sheet determination threshold value in the RAM 154, and ends the image reading process.

Thus, when the image reading process is executed next time, a blank document sheet can be determined more appropriately by using thus determined blank sheet determination threshold value.

As described above, according to this embodiment, if a blank document sheet is detected (S21:N) and if a user indicates that the blank sheet determination threshold value is not adequate by pressing the OK button, for example, (S27:Y), then the pixel number display section 233 in the display screen on the display unit 23 displays the graph having the horizontal axis representing the page number and the vertical axis representing the number of pixels within the predetermined gray level range, enabling the user to discern which sheet has been determined to be blank by determining whether the corresponding dot on the graph is located below the blank sheet detection line. Thus, the user can understand which page will not be determined to be blank by how changing the blank sheet determination threshold value, and thus can easily change the blank sheet determination threshold value to an adequate value.

Because the blank sheet determination threshold value can automatically be changed according to the user's input (S40) in this embodiment, the user can easily change the blank sheet determination threshold value to an adequate value even if the user is unfamiliar with a process to change the blank sheet determination threshold value.

While the invention has been described in detail with reference to the embodiment thereof, it would be apparent to those skilled in the art that various changes and modifications may be made therein without departing from the spirit of the invention.

For example, in the above-described embodiment, the pixel number display section 233 displays the number of pixels within the predetermined gray level range counted in S4 for each page in a graph. However, this is not limitation of the invention. For example, the number of pixels within the predetermined gray level range counted for each page and the blank sheet determination threshold value may be represented in numerical values. Further, the numerical values may be displayed side by side at the same time, or may be displayed at the same position in alternation. Further, each time one document sheet is read, the number of pixels within the predetermined gray level range of the read document sheet and the blank sheet determination threshold value may be displayed in numerical values at the same time or in alternation.

In the above-described embodiment, the display screen is displayed on the display unit 23 if one or more of document sheets are determined to be blank (S22:N). However, the display screen may only be displayed on the display unit 23 if all the read document sheets are determined to be blank (S22:Y).

Figure 7:
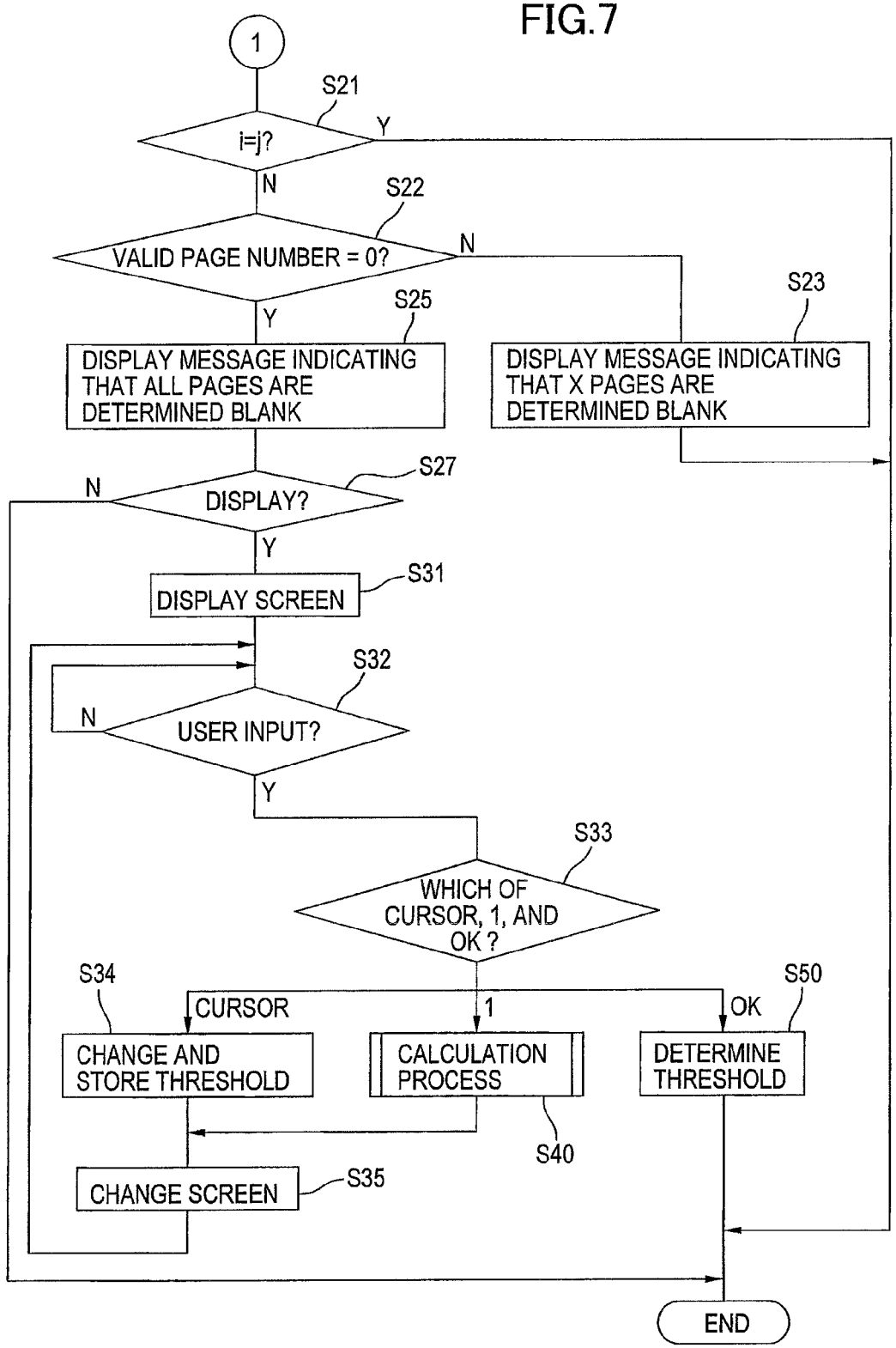
FIG. 7 is a second half of a flowchart representing an image reading process according to a modification of the invention.

More specifically, the process shown in FIG. 4 may be modified to that shown in FIG. 7, which differs from the process of FIG. 4 in that the CPU 152 ends the image reading process after S23, instead of proceeding to S27. In this modification, a message indicating that X pages of the document have been determined to be blank is displayed in S23, but a message "If this determination is deemed incorrect, press OK button" is not displayed in S23.

Figure 8:
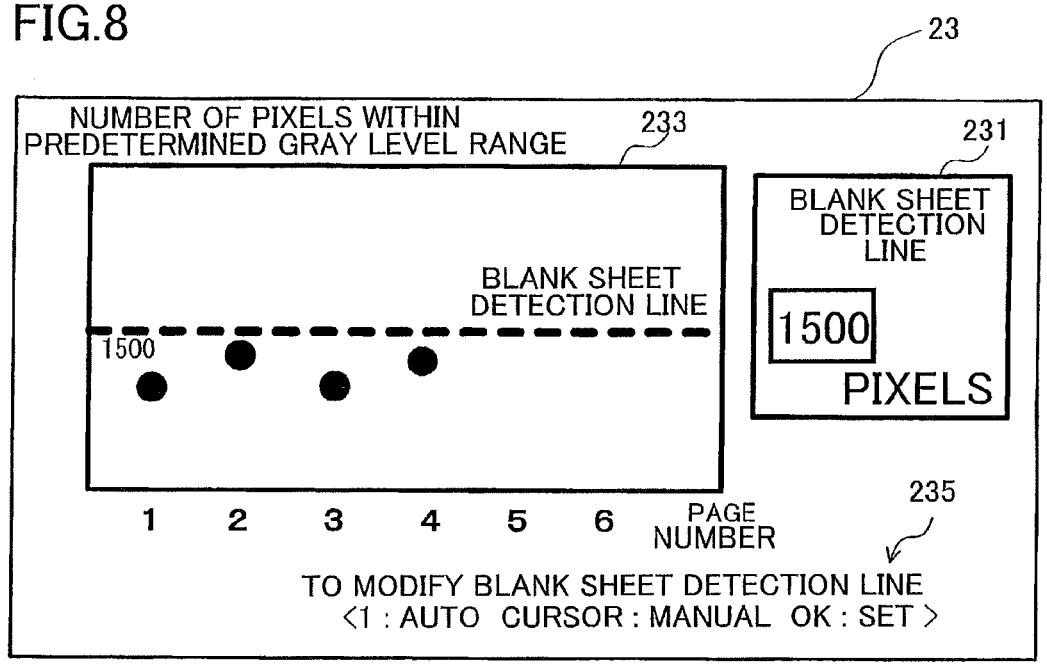
FIG. 8 is an explanatory diagram showing an example of display screen.

If all document sheets have been determined to be blank (S22:Y), it is often the case that a user erroneously set the document upside down or that the blank sheet determination threshold value is not appropriate. In the former case, the user can easily notice that the document has been set upside down. Thus, the display screen, such as that shown in FIG. 8, is displayed on the display unit 23 only when it is highly likely that the blank sheet determination threshold value is not appropriate (S22:Y), thereby improving the operability of the multifunction device 1. In the display screen shown in FIG. 8, the numbers of pixels within the predetermined gray level range of all the document sheets fall below the blank sheet determination threshold value of 1,500 pixels.

The present invention is also applicable to a scanner device without the printer unit 5.

The present invention is applicable not only to a singe-side reading but also to a double-side reading. In the case of a double-sided reading, the above-described process of the present invention can be applied to the scanning of each of the front and back sides of the document sheet.

What is claimed is:

1. An image reader comprising:
    a display unit;
    a reading unit that is configured to read an image on a document sheet to generate read data; and
    a processor configured to:
    count a number of pixels of the read data having more than a predetermined gray level;
    determine that the document sheet is blank when the number of pixels counted is not exceeding a threshold value;
    display on the display unit the number of pixels counted and the threshold value when the document sheet has been determined to be blank, in a manner that the number of pixels can be compared with the threshold value; and
    changes the threshold value.

2. The image reader according to claim 1, wherein when the document sheet includes a plurality of pages and when the reading unit reads an image on each page of the document sheet, the processor is further configured to:
    count the number of pixels having more than the predetermined gray level for each page, and
    display on the display unit the number of pixels counted for each page in a manner that the number of pixels counted for each page can be compared with the threshold value.

3. The image reader according to claim 2, wherein when the determination is made that all of the pages included in the document sheet are blank, the number of pixels counted for each page are displayed on the display a manner enabling comparison with the threshold value.

4. The image reader device according to claim 2, wherein the threshold value is automatically changed in accordance with the number of pixels counted for each page.

5. The image reader device according to claim 1, wherein when the threshold value is changed, the changed threshold value is displayed on the display unit in a manner that the number of pixels can be compared with the changed threshold value.

6. The image reader according to claim 1, the processor further configured to output the read data, wherein the read data is not output when the document sheet is determined to be blank, and the read data is output when the document sheet is not determined to be blank.

* * * * *